July 27, 1965  J. S. W. DAVIDSEN ETAL  3,196,557
CENTRIFUGE MOUNTED MOTION SIMULATOR
Filed Aug. 28, 1961  9 Sheets-Sheet 1

INVENTORS
JESS S.W. DAVIDSEN
BY ESTIN H. BAKER

AGENT

ATTORNEY

July 27, 1965

J. S. W. DAVIDSEN ETAL 3,196,557

CENTRIFUGE MOUNTED MOTION SIMULATOR

Filed Aug. 28, 1961

INVENTORS
JESS S. W. DAVIDSEN
BY ESTIN H. BAKER

AGENT

ATTORNEY

July 27, 1965 J. S. W. DAVIDSEN ETAL 3,196,557
CENTRIFUGE MOUNTED MOTION SIMULATOR
Filed Aug. 28, 1961 9 Sheets-Sheet 5
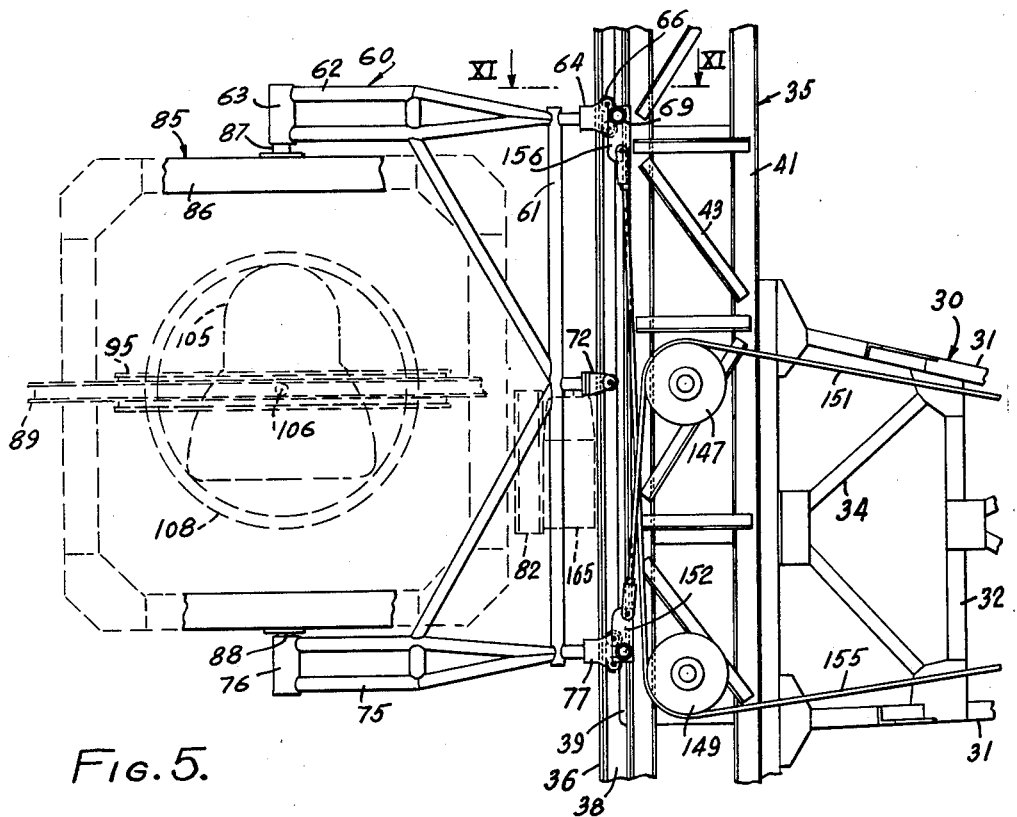
FIG. 5.
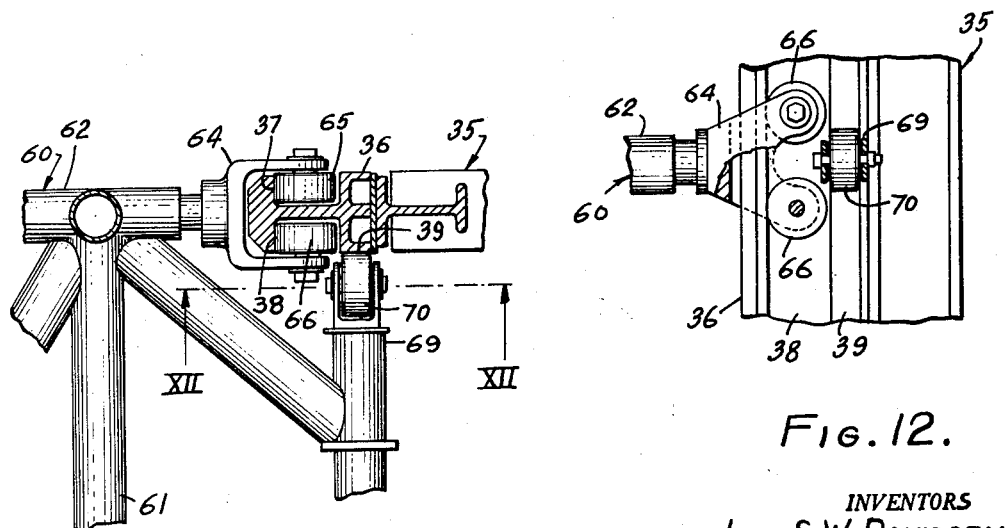
FIG. 11.
FIG. 12.
INVENTORS
JESS S. W. DAVIDSEN
BY ESTIN H. BAKER
AGENT
ATTORNEY

INVENTORS
JESS S. W. DAVIDSEN
BY ESTIN H. BAKER

ATTORNEY

July 27, 1965 J. S. W. DAVIDSEN ET AL 3,196,557
CENTRIFUGE MOUNTED MOTION SIMULATOR
Filed Aug. 28, 1961 9 Sheets-Sheet 8

INVENTORS
JESS S. W. DAVIDSEN
BY ESTIN H. BAKER
AGENT
ATTORNEY

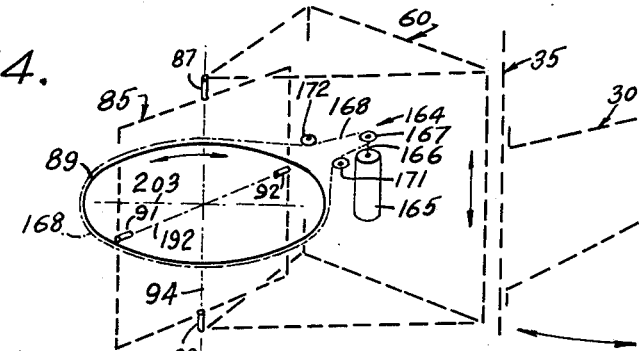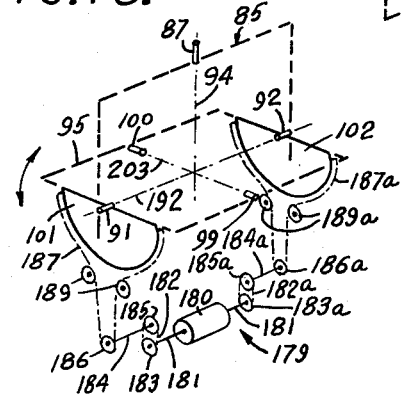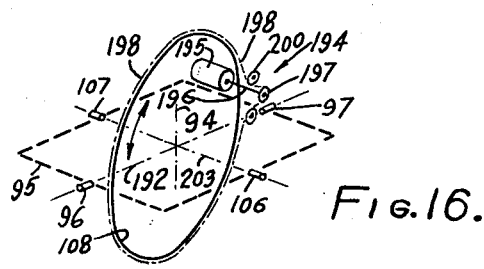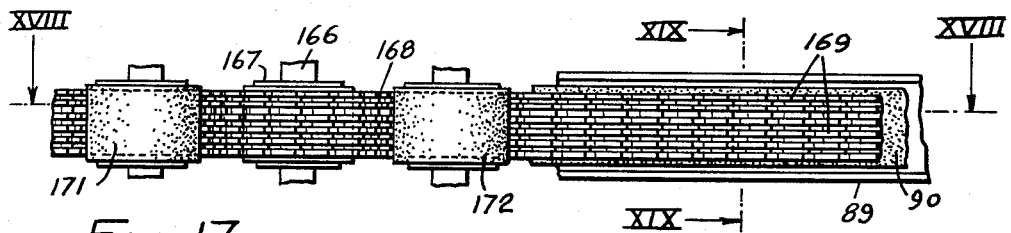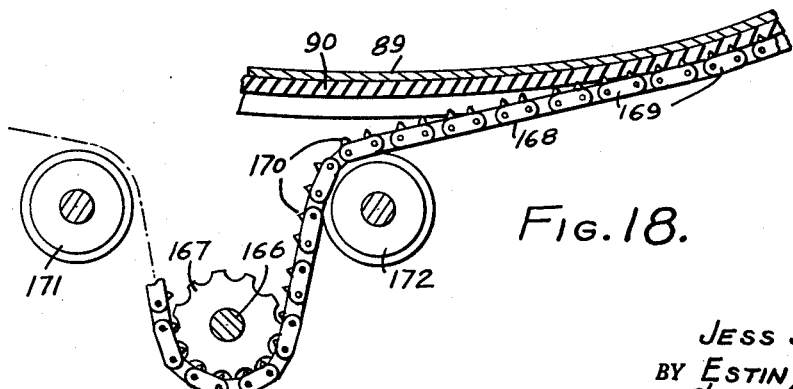

United States Patent Office 3,196,557
Patented July 27, 1965

3,196,557
CENTRIFUGE MOUNTED MOTION SIMULATOR
Jess S. W. Davidsen, Los Altos, and Estin H. Baker, Cupertino, Calif., assignors to the United States of America as represented by the Administrator of the National Aeronautics and Space Administration
Filed Aug. 28, 1961, Ser. No. 134,481
22 Claims. (Cl. 35—12)
(Granted under Title 35, U.S. Code (1952), sec. 266)

The invention described herein may be manufactured and used by and for the Government of the United States of America for governmental purposes without the payment of any royalties thereon or therefor.

This invention relates to a device for simulating in-flight motion of an aircraft or space craft, and more particularly to a centrifuge mounted motion simulator.

There are presently, in existence, several types of man carrying centrifuges. These mechanisms provide for angular movement of a cockpit about a yaw axis, pitch axis, and roll axis, simultaneously with circular horizontal motion of the centrifuge arm. These centrifuges however, do not provide for reversible, vertical cockpit movement simultaneously with the above mentioned motions. This deficiency in prior art devices results in a mechanism wherein not all motions of flight travel are simulated.

Another disadvantage of known simulators is that their centrifuge arm structure is normally pivotally mounted at one end without support at the other end. This type of arrangement requires the use of a heavy arm structure to support the cockpit assembly weight. Furthermore, it necessitates the use of extremely expensive, heavy, custom made drive components.

The present invention overcomes the first mentioned disadvantage by providing the end of the centrifuge arm, remote from its pivotal connection, with elevator mechanism. The cockpit is carried by the elevator mechanism which is capable of vertical translation, thus providing for the flight motion absent in prior art devices.

Additionally, the elevator tower operates as a ground support for the end of the centrifuge arm remote from its pivotal connection. All of the vertical dead load and inertial forces of the cockpit, as well as most of the horizontal inertial forces of the mechanism are carried by the elevator means. This promotes the use of light, low inertia space frame type structures for the centrifuge arm and the elevator structure. This provides many advantages in that the expensive drive trains of prior art devices are no longer necessary. Furthermore, power requirements to actuate the power trains are greatly reduced. Power sources can be located advantageously inertiawise because of drive trains previously not feasible.

It is, therefore, an object of this invention to provide a centrifuge mounted motion simulator which has ground support means for the end of its centrifuge arm remote from the end conventionally having pivotal connection with support structure.

Still another object of this invention is to provide a centrifuge mounted simulator having a manned cockpit carried by elevator structure capable of reversible, vertical translation.

Yet another object of this invention is to provide a centrifuge mounted motion simulator having a centrifuge arm supported at one end by trolley means running on a circular track, the track providing a reaction surface for a centrifuge arm drive cable driven from a power source located at the point of pivotal connection of the other end of the centrifuge arm.

Another object of this invention is to provide a centrifuge mounted motion simulator having elevator structure, capable of vertical translation, carried by the end of a centrifuge arm opposite the end of its conventional pivotal connection; the elevator structure being driven by cables associated with a motor located at the point of pivotal connection of the centrifuge arm.

Still another object of this invention is to provide a centrifuge mounted motion simulator having a gimballed cockpit with associated drive rings for motion about yaw, pitch and roll axes; the drive rings being lined with a resilient deformable material which receive cog drive chains assuring a positive, non-slip, zero backlash frictional drive.

Another object of this invention is to provide a centrifuge mounted motion simulator which can provide simultaneous, rapidly reversible circular horizontal movement, linear vertical movement and angular translation about axes of roll, pitch, and yaw of a manned cockpit, with high rates of reversible linear and angular acceleration with a minimum of backlash and shock on start up and reversal on all motions.

Yet another object of this invention is to provide a centrifuge mounted motion simulator having a minimum number of standardized component parts, advantageously arranged to give an economical article of manufacture.

These and other objects and advantages of this invention will become apparent upon reading the specification in conjunction with the accompanying drawings.

In the drawings:

FIG. 5 is a side elevational view of a portion of the elevator tower and cage showing the manner in which the cage is movable on the tower, and the manner in which the drive cables are connected to the elevator cage for lifting and lowering the cage;

FIG. 11 is a cross sectional view taken along the section lines XI—XI of FIG. 5;

FIG. 12 is a cross sectional view taken along the section lines XII—XII of FIG. 11;

FIG. 14 is a perspective, diagrammatic view showing the location of the power means and drive train for rotating the cockpit about the yaw axis;

FIG. 15 is a perspective, diagrammatic view showing the location of the power means and drive train for rotating the cockpit about the pitch axis;

FIG. 16 is a perspective, diagrammatic view showing the location of the power means and drive train for moving the cockpit about the roll axis;

FIG. 17 is a fragmentary, front elevational view of the yaw drive ring and yaw drive chain associated therewith;

FIG. 18 is a cross sectional view taken along the section lines XVIII—XVIII of FIG. 17;

Figure 1:
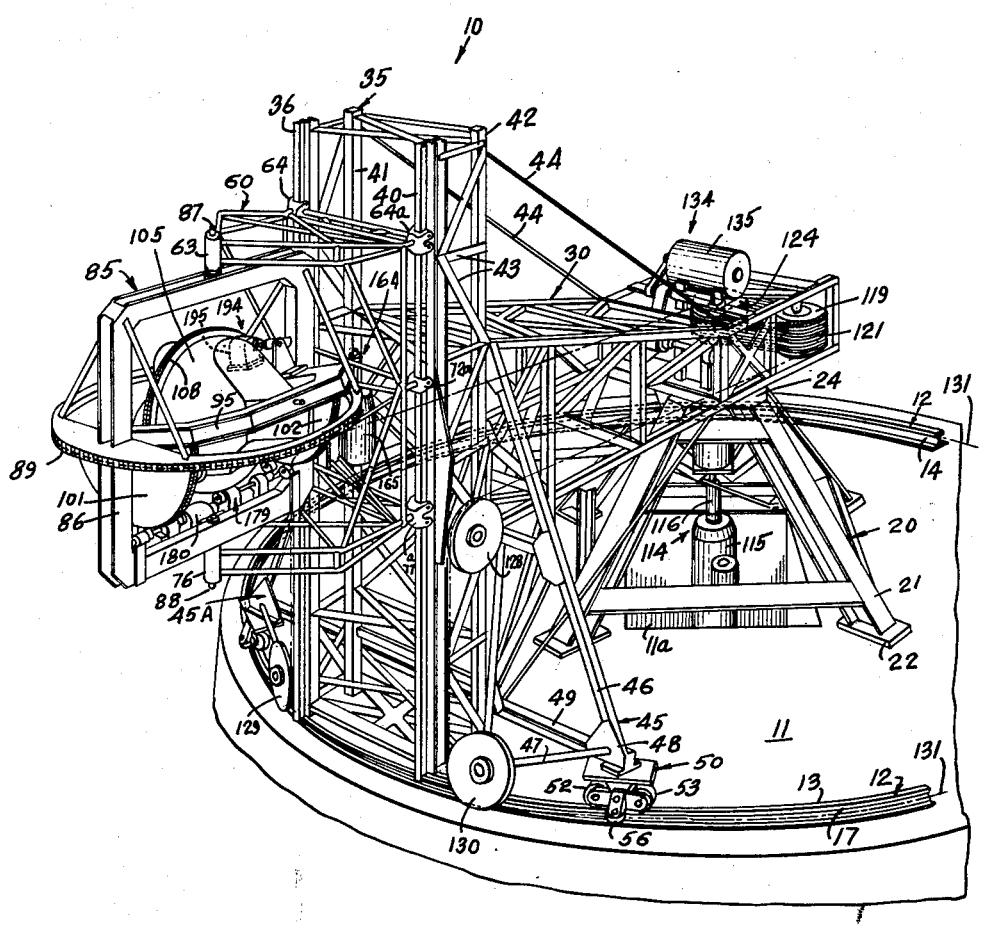
FIG. 1 is a perspective view showing the centrifuge mounted motion simulator of this invention.

Basically, this invention relates to a device which simulates man's flight in an aircraft or spacecraft, and is utilized for training purposes. The centrifuge mounted motion simulator is situated on a concrete foundation. A pylon is rigidly fixed to the foundation and pivotally supports the one end of a truss type centrifuge arm. An elevator tower is fixed to the other end of the centrifuge arm and has elevator wings which carry trolley members. The trolley members run on a circular track which surrounds the pylon and is fixed to the foundation. The end of the centrifuge arm remote from its pivotal connection with the pylon is thus supported by means in the form of the elevator tower, trolley members and track structure. Means are provided to connect said elevator cage with said elevator tower for vertical guided movements on the elevator tower. The elevator cage in turn carries a gimbal mounted cockpit supported by means that permit movement about yaw, pitch, and roll axes.

The centrifuge arm is driven by an endless drive cable which is entrained about the circular track, over appropriate sheaves and about driving drums carried by the centrifuge arm adjacent its pivotal connection with the pylon. The driving drums are driven by a drive train from a centrifuge arm drive motor fixed to the foundation within the pylon. Motor means adjacent to the driving drums, thru an appropriate power train, also drives winding drums which raise and lower the elevator cage and the cockpit carried thereby. Cables are fixed to these winding drums, directed over appropriate sheaves and thereafter fixed to the elevator cage to transfer the motion of the winding drums to the elevator cage. The winding drums and driving drums, as well as the area of the track with which the centrifuge arm drive cable comes in contact, are lined with a resilient material to permit temporary indentation to increase the coefficient of the friction between these members and the drive cables. Means are provided for tensioning the drive cables assuring a nonslip zero backlash drive.

The gimbal mounted cockpit includes a yaw frame which is pivotally connected to the elevator cage. A yaw drive ring is fixed to the yaw frame and is driven by an endless yaw drive chain rotated by a yaw drive motor carried by the elevator cage. This mechanism provides for movement of the cockpit about the yaw axis.

A pitch frame is pivotally mounted within the yaw frame providing for pivotal movement about the pitch axis. Pitch drive segments are suspended from the pitch frame to which the ends of pitch drive chains are anchored. These chains are moved by an appropriate power train and power means carried by the yaw frame.

The cockpit is pivotally mounted on the pitch frame providing for its movement about the roll axis. A roll drive ring is fixed to the cockpit. It is engaged by an endless roll drive chain which is also trained about the output sprocket of a roll drive motor fixed to the pitch frame. The yaw drive ring, pitch drive segments and roll drive ring are lined with a resilient deformable material. The yaw drive chain, pitch drive chains and roll drive chain are provided with cogs which form temporary indentations in these linings. Tensioning mechanism is also provided for the various chains to insure a tight, nonslip, zero backlash friction drive for moving the cockpit above the various axes.

The centrifuge mounted motion simulator is designated generally as 10. The assembly 10 includes the general components of the foundation 11, the track 12, the pylon 20, the centrifuge arm 30, the elevator tower 35, the elevator cage 60, and the gimbal structure 85 including the cockpit 105. The assembly is powered by the centrifuge drive 114, elevator drive 134, yaw drive 164, pitch drive 179, and roll drive 194. Control system 205, as manipulated by the operator, determines the individual or simultaneous movements of the various drive systems.

Figure 3:
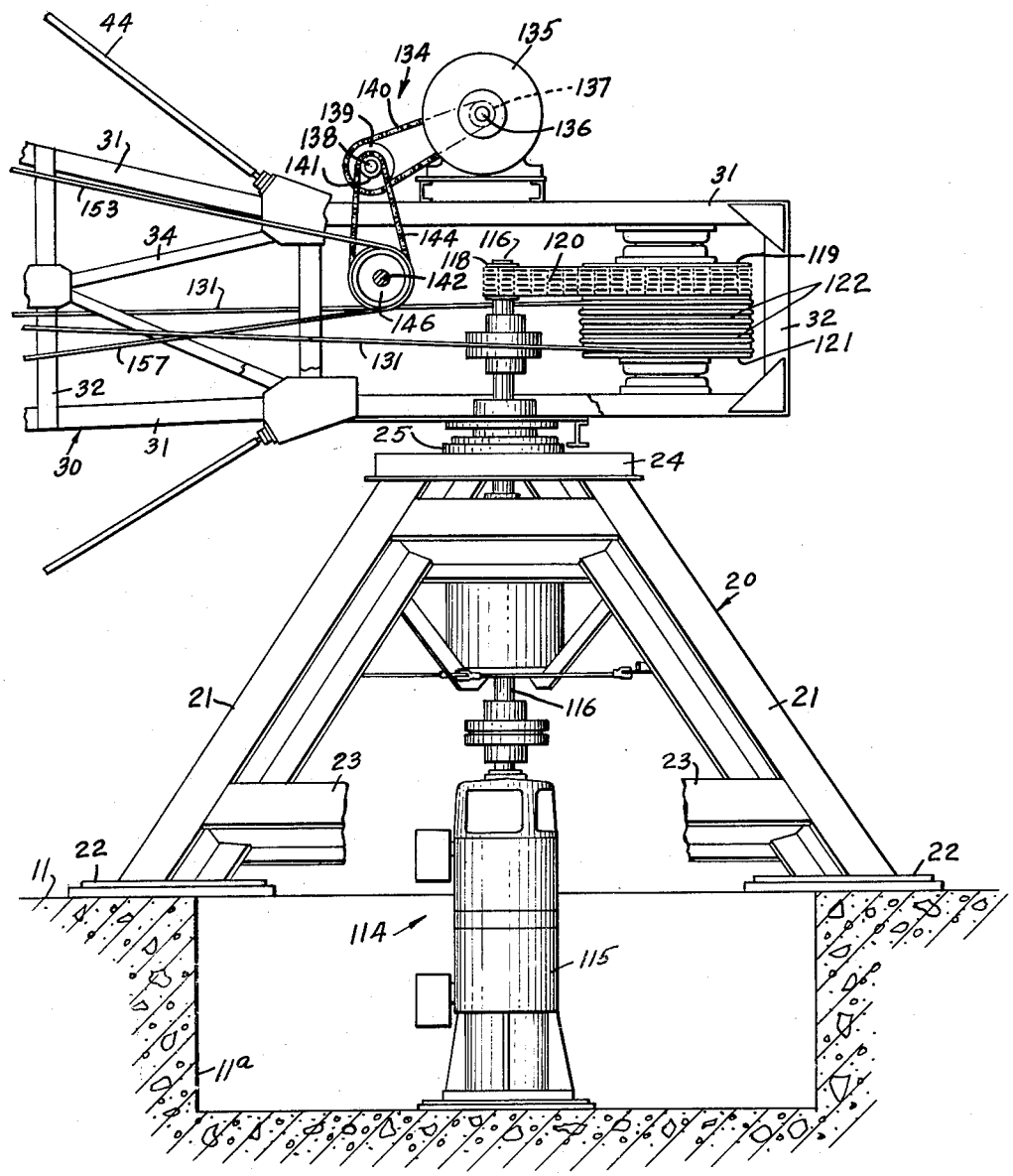
FIG. 3 is a segmental, side elevational view of the centrifuge mounted motion simulator showing the pivotal connection of the centrifuge arm with the pylon and a portion of the drive train for the centrifuge arm and elevator structure.

Referring now more particularly to the details of the invention, FIGS. 1 and 3 best illustrate the foundation 11 now to be described. The foundation 11 is composed of material such as concrete. It is of sufficient size and depth to adequately support the centrifuge mounted motion simulator assembly 10. Foundation 11 is provided with a centrally located pit 11a which receives part of the centrifuge arm drive 114 to be explained more fully hereinafter.

Figure 7:
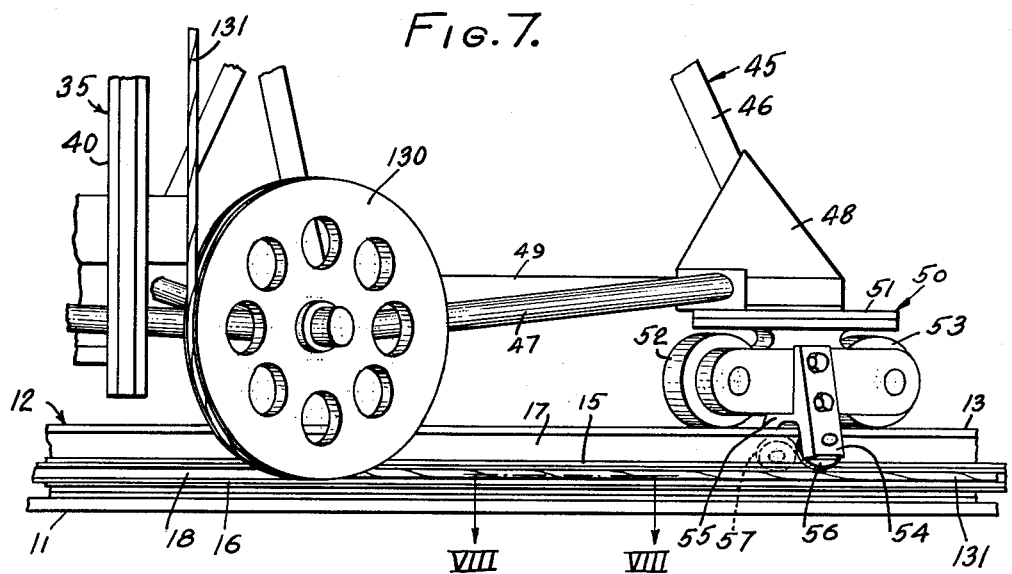
FIG. 7 is a segmental, elevational view showing the simulator elevator wing trolley cooperating with a circular track, and the manner in which the centrifuge arm drive cable is associated with the circular track.
Figure 8:
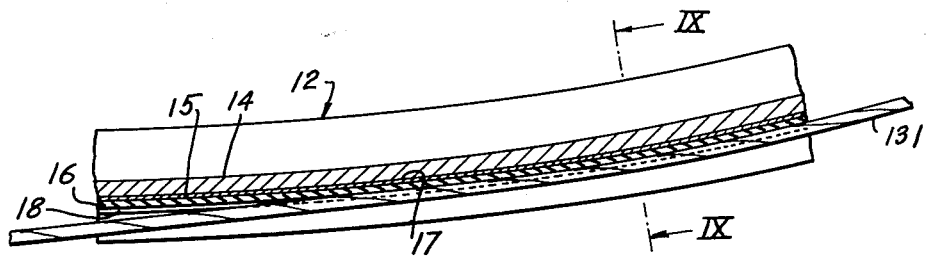
FIG. 8 is a cross sectional view taken along the section lines VIII—VIII of FIG. 7.
Figure 19:
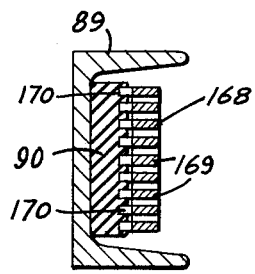
FIG. 19 is a cross sectional view taken along the section lines XIX—XIX of FIG. 17.
Figure 9:
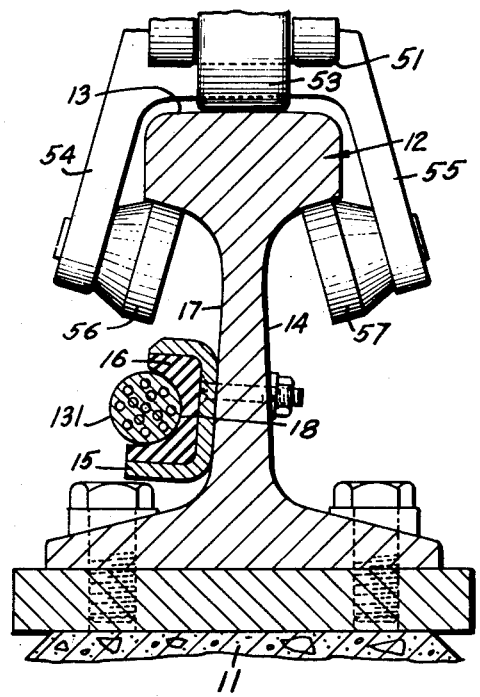
FIG. 9 is a cross sectional view taken along the section lines IX—IX of FIG. 8.

A continuous circular track 12 surrounds the pit 11a. The track 12 is a section of a conventional railroad track having an I-shaped cross sectional configuration. It is fixed to the foundation in a conventional manner. The top surface 13 (FIGS. 7 and 9) of track 12 operates as a rollway for the trolley mechanism of elevator tower 35 to be explained more fully hereinafter. Inside and outside grooves 14 and 17 respectively are formed about the inner and outer peripheries of track 12 as a result of its I-shaped cross sectional configuration. A resilient material 16 (FIG. 9), such as rubber, is bonded to a guide channel 15 fixed to the track outside groove 17 intermediate between the top and bottom edges thereof. The base of the guide channel 15, which is generally U-shaped in cross section, is fixed directly to the track 12 by conventional fastening means such as bolting. A generally semicircular guide notch 18 is formed in the deformable material 16 which lies within the guide channel 15. The guide notch 18 receives the centrifuge arm drive cable in a manner to be explained more fully hereinafter.

Positioned immediately over the foundation pit 11a is the pivot pylon 20. It has a pyramidal configuration formed from four legs 21 which are tied together by cross bracing 23. The bottoms of the legs 21 are fixed to plate like feet 22 which are fixed to the foundation 11 by conventional fastening means. The tops of the legs are secured to a platform 24 positioned parallel with respect to the foundation 11. Rigidly fixed to the platform 24 is a ring-like pivot bearing 25. The portion of the platform 24 within the pivot bearing 25 is removed to allow passage of a component of the centrifuge drive mechanism 114. Securely mounted for rotation in the pivot bearing 25 is the inner or pivot end of the centrifuge arm 30. The centrifuge arm 30 has a generally rectangular cross sectional configuration, of the space frame type, and is constructed from aluminum members. It has longitudinal stringers 31 connected together at spaced intervals by upright stringers 32 and horizontal stringers 33. Cross bracing 34 is fixed diagonally between the stringers where necessary to provide the necessary strength properties for the centrifuge arm. The majority of the centrifuge arm, which is of substantial length, projects radially from its point of pivotal connection with pivot pylon 20. The far end, or elevator end of the centrifuge arm terminates adjacent the track 12.

The elevator tower 35 (FIGS. 1, 4 and 5), which is also a rectangular cross sectional, truss space frame type, aluminum structure, is fixed to the far end of the centrifuge arm 30. It is disposed generally transverse with respect to the centrifuge arm 30, the long dimension of the structure being generally vertical. The elevator tower 35 is composed of corner guide posts 36, 40, and corner posts 41 and 42, all of which are tied together by horizontal and diagonal bracing 43. The far ends of centrifuge arm longitudinal stringers 31 are connected directly to the corner posts 41 and 42 which project above and below the arm. Adjacent the connection of the lower longitudinal stringers 31 with the corner posts 41 and 42 are fixed sheave brackets 58 and 59 the purpose of which will be explained subsequently. Guy rods 44 are tied between the top and bottom of corner posts 41 and 42, and the inner end of centrifuge arm 30 to reinforce the extremities of the tower.

The guide posts 36 and 40 operate to direct the travel of an elevator cage carried by the elevator tower, and are located approximately over the track 12. Since each of these guide posts is identical, only the guide post 36 will be explained in detail. FIGS. 11 and 12 best illustrate the cross sectional and elevational configurations of the guide post 36. The cross sectional configuration of the guide post 36 appears as back to back I-shaped members. The grooves formed by the formation of the front I-member provide guide ways 37 and 38 for carriage rollers of the elevator cage. The inner inside surface of the front I-member provides a runway 39 for tangential stabilizer casters also carried by the elevator cage.

Figure 4:
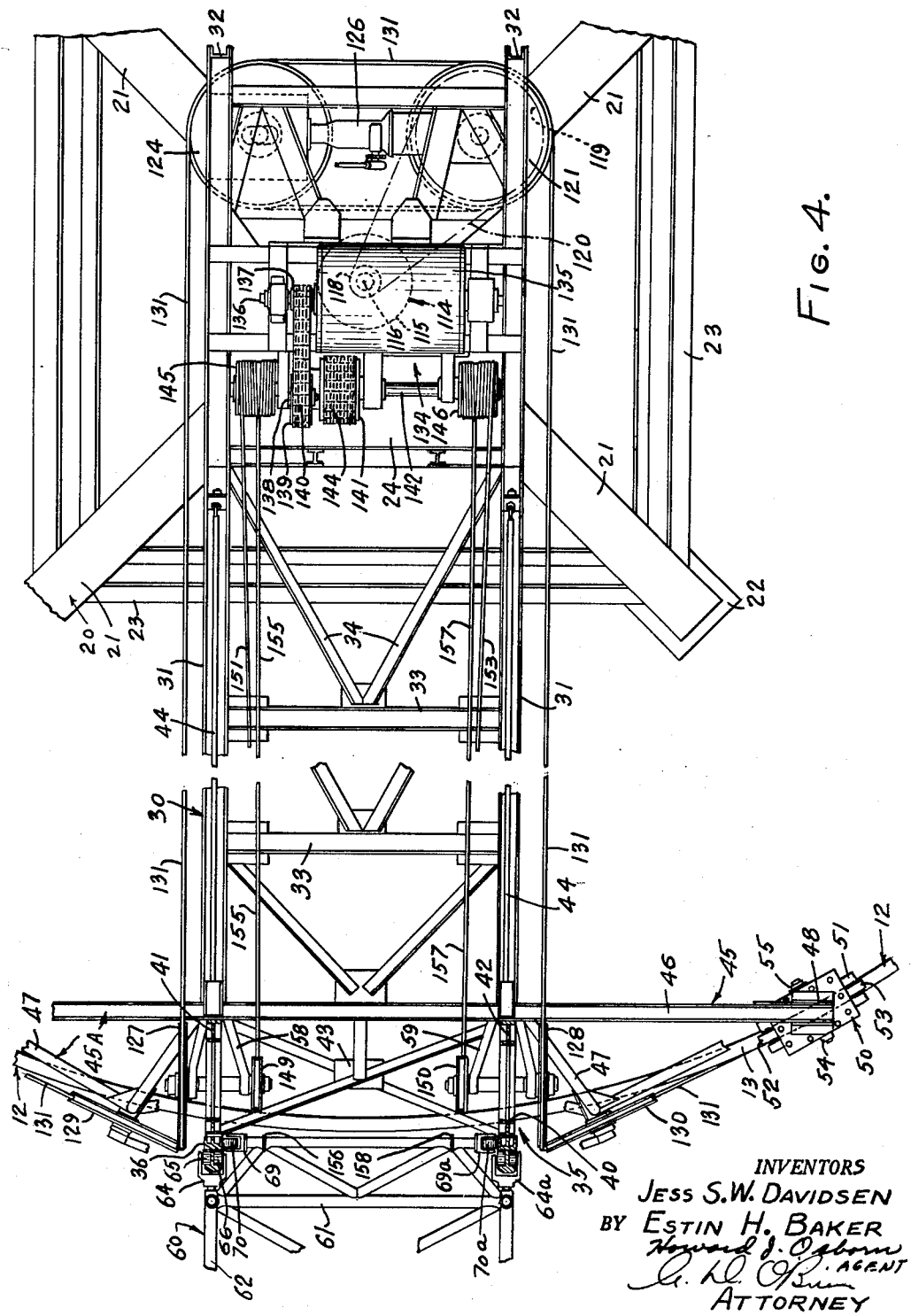
FIG. 4 is a segmental, top plan view of the centrifuge mounted motion simulator showing the drive train for the centrifuge arm and the elevator structure.

Fixed to the elevator tower 35 and projecting in opposite directions from the sides thereof are elevator trolley wings 45 and 45A (FIGS. 1 and 4). Since the elevator trolley wing 45A is a mirror image of the elevator trolley wing 45, only the latter will be explained in detail. A wing beam 46 (FIG. 1) is fixed to the elevator tower 35 adjacent to the connection of its corner post 42 with an upper longitudinal stringer 31 of the centrifuge arm 30. This wing beam depends downwardly and is directed outwardly such that its other end lies over the track 12, where it is fixed to a connector 48. A horizontal beam 49 and angle member 47 are both joined to the connector 48 and to the bottom end of corner post 42 and guide post 40 respectively. Additional cross bracing is appropriately located to provide adequate strength for the elevator trolley wing. The trolley 50 (FIG. 7) is fixed to the connector 48. Trolley suspension structure 51 carries trolley wheels 52 which ride on the track surface 13. Trolley retainers 54 and 55, located transversely with respect to the trolley wheels 52 and 53, are fixed to the trolley suspension 51. Bevelled retainer rollers 56 and 57 are journalled on the retainers 54 and 55 respectively, and engage the outside and inside grooves 17 and 14 of the track 12. The retainer rollers maintain the trolley wheels on the track, their primary function being that of preventing transverse movement and lifting of the trolleys with respect to the track.

Figure 2:
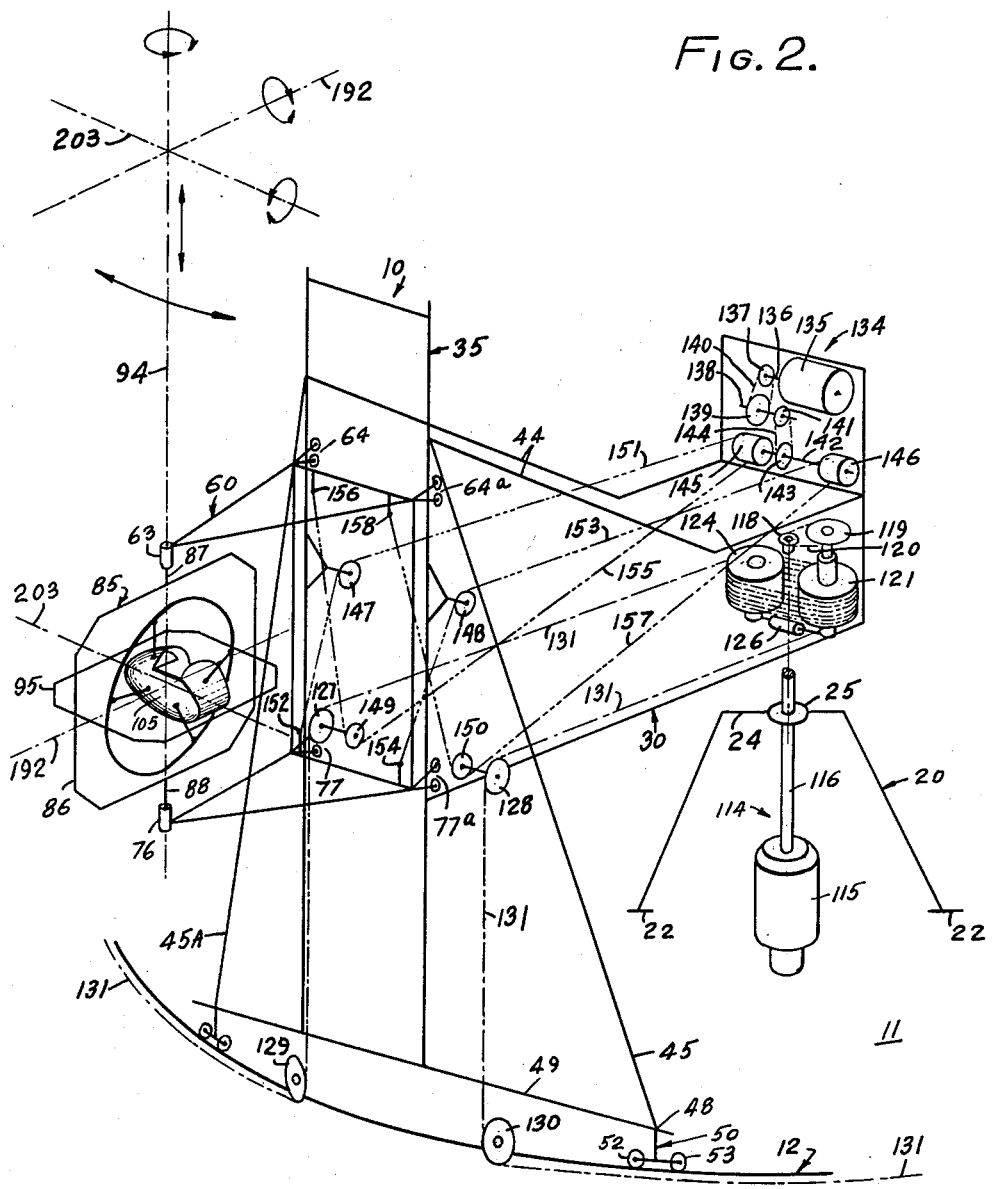
FIG. 2 is a diagrammatic view showing the drive means for the centrifuge arm and elevator structure, as well as the five degree freedom of motion of the simulator.

The elevator cage 60 (FIGS. 1, 5, 6 and 13) is a steel tube, trussed structure carried by the elevator tower 35. The back 61 of the elevator cage is a rectangular frame-like member to which a generally triangular shaped top 62 and bottom 75 are secured. The top 62 projects at substantially a right angle from the back 61. It is supported by angular bracing fixed to the back 61. The apex of the elevator cage top 62 or portion remote from back 61 carries a shaft housing 63 located on a vertical axis or yaw axis 94 (FIG. 2). The elevator cage top 62 projects a short distance behind the elevator cage back 61 (FIG. 11). Top vertical guide carriages 64 and 64a are carried by the projection. They are located on opposite sides of the elevator cage top and are substantially identical in construction. Because of the similarity between the carriages, only the carriage 64 will be explained in detail.

The carriage 64 is generally yoke shaped as illustrated in FIG. 11. The yoke is further bifurcated as shown in FIG. 12. The carriage 64 thus has four finger-like portions, two of which appear on either side of the guidepost 36 of elevator tower 35. The finger-like portions on one side of the carriage 64 have journalled thereon upper and lower outside guide rollers 65, the opposing finger-like portions having journalled thereon upper and lower inside guide rollers 66. The upper and lower outside guide rollers 65 operate in guideway 37 of guidepost 36, whereas upper and lower inside guide rollers 66 operate in guideway 38 of the guidepost 36. The yoke-like configuration of the carriage 64 allows it to straddle the guidepost 36 and be directed thereby.

The projecting portion of the cage top 62 also carries top tangential stabilizer members 69 and 69a (FIG. 4). These stabilizer members are essentially fixed casters having wheels 70 and 70a which operate on the runway surfaces of the elevator tower guidepost (runway surface 39 of guidepost 36).

Figure 13:
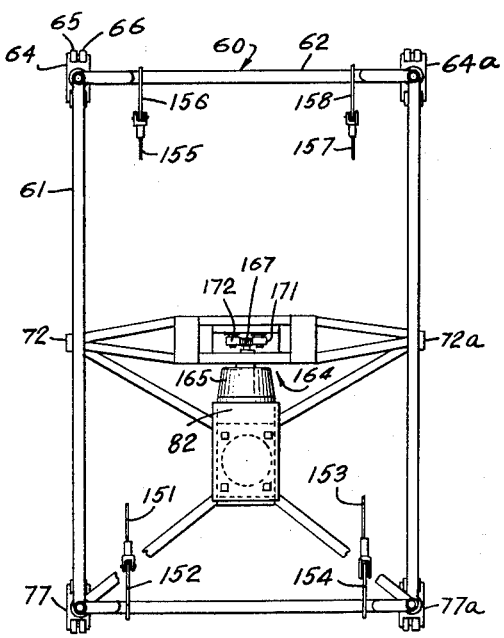
FIG. 13 is a cross sectional view taken along the section lines XIII—XIII of FIG. 6.

The elevator cage bottom 75 is generally similar in configuration to the elevator cage top 62. It projects normally from the bottom of elevator cage back 61 and has a shaft housing 76 which opposes the shaft housing 63 (FIG. 5) and is aligned therewith. The elevator cage bottom 75 also projects behind the elevator cage back 61. This projecting portion carries bottom vertical guide carriages 77 and 77a (FIG. 13). Stabilizer members (not shown) cooperate with the bottom vertical guide carriages in a manner similar to the arrangement in which the top stabilizer members 69 and 69a operate as shown in FIG. 4.

Intermediate the elevator cage top and bottom 62 and 75 are positioned intermediate vertical guide carriages 72 and 72a (FIG. 13). These guide carriages are basically similar in construction to the top vertical guide carriage 64, except that only inside and outside guide rollers are utilized rather than two pair as in the top vertical guide carriage 64.

The combined vertical guide carriages direct the movement of the elevator cage 60 on the elevator tower 35. As shown in FIG. 4, the guide carriages limit movement of the elevator in a radial direction away from the centrifuge arm 30. The stabilizer members limit movement of the elevator cage 60 in a transverse direction with respect to the centrifuge arm 30. Elevator cage 60 is otherwise free to move vertically on the elevator tower within the extremities of the guideposts 36 and 40 or within stops (not shown) placed on the guidepost.

The gimbal structure, generally 85, which is suspended from the elevator cage 60 includes the yaw frame structure 86 and pitch frame structure 95 as well as cockpit 105.

Figure 6:
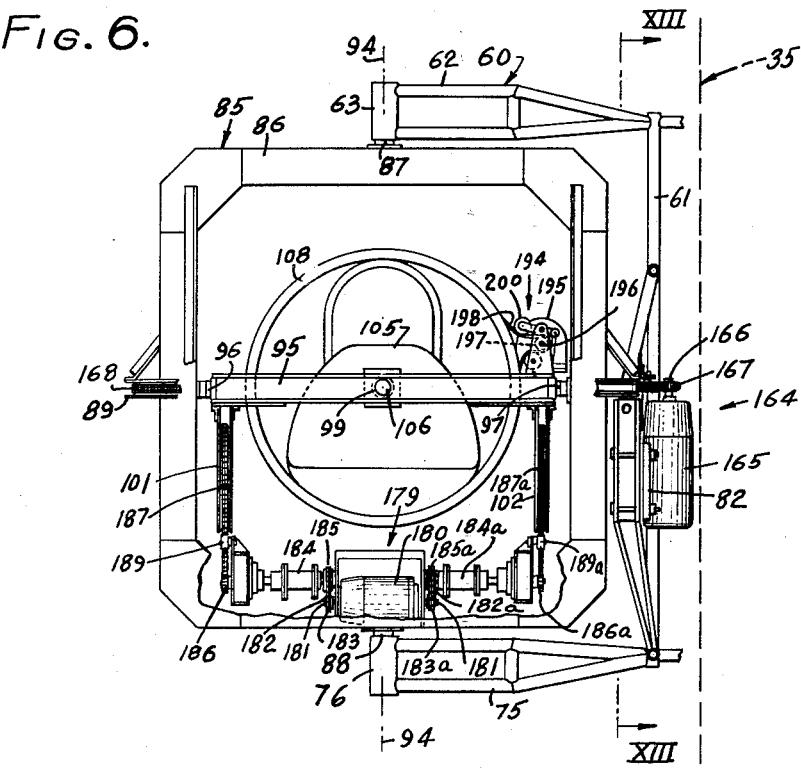
FIG. 6 is a segmental, side elevational view of the simulator showing the manner in which the cockpit is connected to the elevator cage, and the power means and drive trains for moving the cockpit about the yaw, pitch, and roll axes.

The yaw frame 86 is essentially an aluminum picture frame-like member with an open center. The upper and lower members of the frame are provided with opposed and aligned upper and lower pivot shafts 87 and 88, respectively; which are journalled in the shaft housing 63 and 76 of the elevator cage 60 (FIG. 6). A yaw frame drive ring 89 (FIGS. 1, 6, 17, 18 and 19) surrounds the yaw frame 86 and is fixed to the upright members thereof. The yaw frame drive ring 89 is a U-shaped channel member, and has its interior lined with a resilient, deformable material 90 (FIG. 18), such as rubber. The purpose for the lining 90 will be explained more fully hereinafter. Also, fixed to the upright members of the yaw frame 86, intermediate the ends, are pitch pivot pins 91 and 92. These pitch pivot pins project into the interior of the yaw frame 86, and are in opposed, aligned, relationship along a horizontal axis or the pitch axis 192.

A picture frame-like pitch frame 95 with an open center, and having smaller overall dimensions than the yaw frame 86, is located between the upright members of said yaw frame. Opposing side members of the pitch frame are provided with bearing apertures 96 and 97 (FIG. 6) which receive the pitch pivot pins 91 and 92 respectively. The pitch frame 95 is capable of movement about the pitch axis 192. Roll axle bearings 99 and 100 are located at intermediate points on the end members of the pitch frame and are in opposing and aligned relationship. These bearings are located along the roll axis 203. A half-moon shaped pitch drive segment 101 is fixed underneath the one side of the pitch frame 95, and a similar pitch drive segment 102 is fixed underneath the other side of the pitch frame 95. The peripheries of these segments are grooved, the grooves being lined with a resilient, deformable material (not shown), such as the material 90 which lines the yaw frame drive ring 89. The pitch drive segments 101 and 102 are utilized to rotate the cockpit 105 about the pitch axis in a manner to be explained more fully hereinafter.

The cockpit 105 is a modified section of an airplane fuselage and is generally dome shaped with a hollow interior provided with access means, seating means for the operator and control means, all of which are conventional and not shown in detail. Projecting from opposite ends of the cockpit 105 are roll axles 106 and 107. They are journalled in the roll axle bearings 99 and 100 formed in the pitch frame 95. This pivotal connection provides means whereby the cockpit may move about the roll axis 203. A ring-like roll drive track 108 surrounds the cockpit and is fixed thereto in the manner best shown in FIG. 6. The roll drive track 108 is also U-shaped in cross section, the interior of the track being lined with a resilient, deformable material such as 90.

Reference will now be made to means in the form of power and drive trains utilized to move the cockpit in various directions. The first of these means to be explained will be the centrifuge drive 114 which imparts reversible, horizontal, circular translation to the centrifuge arm 30 and cockpit 105 carried thereby.

The centrifuge drive motor 115 (FIGS. 1 and 3) is set on end in the foundation pit 11a where the base thereof is anchored to the foundation. The centrifuge output or driveshaft 116, including intermittently spaced flexible couplings, projects upwardly from the motor and through the opening formed in the pylon platform 24 within the pivot bearing 25 as previously described. A centrifuge drive sprocket 118 (FIG. 3) is fixed on the centrifuge shaft 116 between antifriction bearings, mounted to the pivot end of the centrifuge arm. An endless centrifuge drive multiple roller chain 120 is entrained about the centrifuge drive sprocket 118 and a centrifuge driven sprocket 119 which forms a part of fixed driving drum 121. The fixed driving drum 121 is journalled in bearings fixed to the longitudinal stringers 31 of centrifuge arm 30 (FIG. 3). It has a multiplicity of grooves 122 which are lined with a resilient material having a high coefficient of friction. A movable driving drum 124 is journalled in slidable bearings which are also fixed to the longitudinal stringers of the centrifuge arm 30. It also has a multiplicity of lined grooves 125 similar to and horizontally aligned with the grooves 122.

Tensioning mechanism 126 (FIG. 4), such as a conventional mechanical screw jack is positioned between the bearings of the stationary driving drum and the bearings of the movable driving drum. It is used to separate the driving drums and thereby tension a centrifuge drive cable which is wrapped about the grooves and driven by the driving drums.

An upper centrifuge sheave 127 is fixed to the outer end of a shaft journalled in sheave bracket 58. An upper centrifuge sheave 128 is similarly fixed to a shaft carried by sheave bracket 59 located on the other side of the centrifuge arm 30. These sheaves are positioned outside the centrifuge arm 30 and the elevator tower 35 so that their structure does not interfere with the centrifuge arm drive cable. Lower centrifuge sheaves 129 and 130 are journalled upon angle member projections (angle member 47 of elevator wing 45) as best shown in FIG. 4. These sheaves are located immediately below the upper centrifuge sheaves 127 and 128, and outside of and tangential to the track 12.

Figure 10:
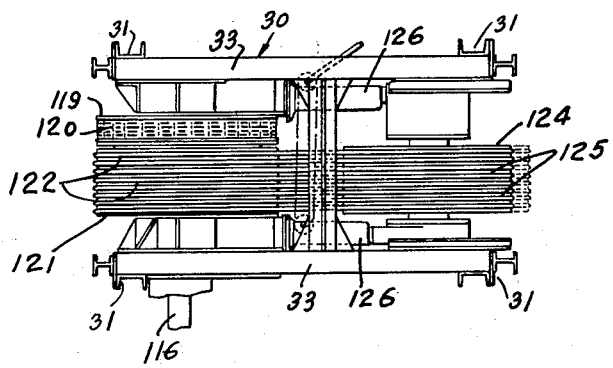
FIG. 10 is a fragmentary end elevational view of the centrifuge arm, partially cut away, to reveal the driving drums of the centrifuge arm and the means for tensioning the centrifuge arm drive cable driven by said driving drum.

An endless centrifuge drive in the form of an elongated flexible member, such as cable or rope 131, surrounds the track 12, and lies in the guide notch 18. It is directed under the lower centrifuge sheaves 129 and 130 and over the upper centrifuge sheaves 127 and 128. The centrifuge drive cable 131 is then directed to the pivot end of the centrifuge arm 30 and wrapped around the lined grooves 122 and 125 of stationary driving drum 121 and movable driving drum 124, respectively. The manner in which the centrifuge drive cable 131 is wrapped around the driving drums is best illustrated in FIG. 10. It has been found that a wire cable operates satisfactorily; however, it is to be understood that within the broadest aspect of the invention other equivalent material might be utilized. The endless centrifuge drive 131 is tensioned by the jack 126 which separates the moveable driving drum 124 from the stationary driving drum 121.

The elevator drive system 134 provides for vertical translation of the elevator cage 60 and the cockpit carried thereby. An elevator drive motor 135 (FIGS. 1, 3 and 4) is fixed on the top side of the upper longitudinal stringers 31 of the centrifuge arm 30. It is located at the inner end of the centrifuge arm 30 to minimize inertial forces created upon circular translation of the centrifuge arm. The elevator drive shaft 136 of the elevator drive motor is provided with a drive sprocket 137. It powers elevator idler shaft 138 via an idler shaft silent drive chain 140 which is entrained thereabout and about idler shaft driven sprocket 139. An idler shaft drive sprocket 141 powers a line shaft 142 which has a line shaft sprocket 143. They are driven by line shaft silent drive chain 144 which is entrained about sprockets 141, 143. Winding drums 145 and 146, each having adjacent reversely wound grooves, are fixed to opposite ends of the line shaft 142.

Elevator lowering sheave 149 is fixed to the other end of the shaft journalled in sheave bracket 58 (FIG. 4), and lowering sheave 150 is keyed to the inner end of the shaft journalled in sheave bracket 59 (FIGS. 2 and 4). Lift sheaves 147 and 148 are keyed to shafts journalled in brackets fixed to the elevator tower 35 which are located, respectively, approximately above the sheave brackets 58 and 59 as best shown in FIG. 2.

Lift cable 151 (FIG. 2) is anchored to one side of the winding drum 145 and directed over lift sheave 147 and connected to take up eye 152 which is fixed to the bottom tubular member of elevator cage back 61. Another lift cable 153 is fixed to one side of winding drum 146, the side that has grooves wound similarly to the side of the winding drum 145 to which the lift cable 151 is connected, and directed over lift sheave 148 and connected to take up eye 154 connected to the other side of the lower tubular member of elevator cage back 61.

A lowering cable 155 is anchored to the other end of the winding drum 145 and is directed under the lowering sheave 149 and fixed at the other end to take up eye 156 which is fixed to the upper tubular member of elevator cage back 61. Lowering cable 157 is anchored to the other side of winding drum 146, directed under lowering sheave 150 and is fixed at the other end to lowering cable take-up 158 which is connected to the other side of the upper tubular member of elevator cage back 61. Depending on the direction of rotation of elevator drive motor 135, which is reversible, lift cables 151 and 153, and lowering cables 155, 157 are taken up or played out from the winding drums 145 and 146 causing vertical movement of the elevator cage 60 and the cockpit 105, carried thereby.

Means in the form of yaw drive 164 (FIGS. 6 and 14) is responsible for movement of the cockpit 105 about the yaw axis 94. Yaw drive motor 165 is mounted on yaw motor mount 82 carried by the elevator cage back 61. The yaw motor 165 has an output shaft 166 to which is fixed yaw motor drive sprocket 167.

The yaw motor drive sprocket 167 moves a yaw motor drive chain 168 (FIG. 18) which is also entrained about the yaw drive ring 89 fixed to the yaw frame 86. It is of the endless silent type having links 169 with projecting teeth 170. Adjustable yaw motor tensioning spring loaded idlers 171 and 172 (FIG. 18), of conventional design, engage the back side of the yaw drive chain 68 and provide means for taking up chain slack.

Means in the form of pitch drive 179 (FIGS. 6 and 15) provides for movement of the cockpit 105 about the pitch axis. The pitch motor 180 is carried by the bottom of the yaw frame 86. It has a through drive shaft 181 with drive sprockets 183 and 183a fixed to its opposite ends. The pitch motor drive sprockets 183 and 183a move transfer shaft driven sprockets 185 and 185a fixed to the transfer shafts 184 and 184a journalled on the yaw frame bottom, via pitch motor silent drive chains 182 and 182a. The transfer shafts 184 and 184a have transfer shaft drive pinion sprockets 186 and 186a fixed thereto and positioned in vertical alignment with respect to the pitch drive segments 101 and 102 respectively. Pitch segment silent drive chains 187 and 187a have their open ends anchored to the pitch drive segments 101 and 102 respectively, adjacent the pitch frame 95. This forms a half chain arrangement, the loop ends of the pitch drive chains 187 and 187a being driven by the transfer shaft drive sprockets 186 and 186a. These pitch drive chains are the same type as the yaw drive chain 168.

Tensioning means, in the form of tensioning rollers 189 and 189a (FIGS. 6 and 15) engage the back side of the pitch segment drive chains 187 and 187a and take up the slack in the chains to provide a nonslip, zero backlash drive.

Means in the form of roll drive 194 (FIGS. 6 and 16) provides for movement of the cockpit 105 about the roll axis 203. Roll drive motor 195 is carried by the inner side member of pitch frame 95. Drive shaft 196 of roll drive motor 195 is provided with a sprocket 197 which drives an endless roll silent drive chain 198. The roll drive chain 198 also encircles the roll drive track 108 which is secured to the cockpit 105. The roll drive chain 198 like pitch drive chain 68 is of the cog chain variety.

Conventional tensioning means 200, which includes a pair of tensioning rollers located on either side and in front of the roll drive sprocket 197 (FIG. 6), engage the back of the roll drive chain 198 to take up slack in the chain and force the cogs thereof into contact with the deformable resilient material lining the roll drive track 108. The roll drive motor 195 is reversible providing clock-wise and counter clock-wise movement of the cockpit 105 about the roll axis.

Safety brakes may be utilized to control movement about the yaw, pitch and roll axes. These may be controlled manually or by overspeed switches. The elevator mechanism is normally provided with limit switches which control brake means that prevents excessive vertical travel of the elevator cage. The elevator brake as well as a brake for the centrifuge arm are associated with their respective motors. These structures are generally considered conventional and are, therefore, not explained in detail.

Figure 20:
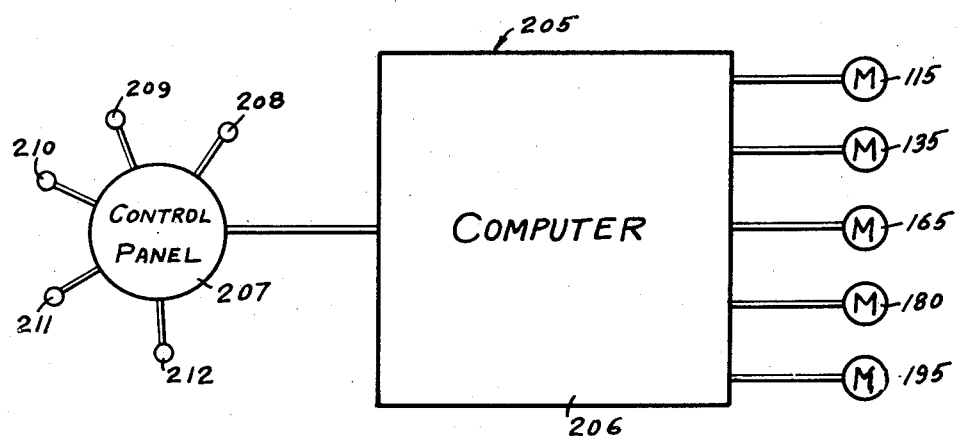
FIG. 20 is a schematic view showing the control system for the centrifuge mounted motion simulator.

The control system 205 (FIG. 20) for the motion simulator assembly 10 is illustrated diagrammatically. The control panel 207, which is located in the cockpit, and the computer 206 which may be positioned at a control panel fixed to the foundation or otherwise conveniently located, are all of conventional design. The centrifuge drive motor 115, the elevator drive motor 135, the yaw drive motor 165, the pitch drive motor 180 and the roll drive motor 195 are all electrically connected to the computer 206 in a conventional manner. This is also true of the centrifuge control 208, the elevator control 209, the yaw control 210, the pitch control 211 and roll control 212 all of which are operable at the control panel 207 located in the cockpit 105.

Operation

Within the broadest aspect of the invention, it is to be understood that the various motion simulations of the motion simulator assembly 10 can be controlled from within or without the cockpit. Normally, the computer will be set up for a programmed series of combined motions. The signals from the computer are fed to the various drive motors to produce the movements. These programmed motions may deviate from true flight in which case the pilot in the cockpit must attempt to counteract by manipulation of controls within the cockpit. However, for purposes of illustration, the operation of the simulator will be explained as controlled from the cockpit as if unprogrammed since the programming is conventional.

If the operator within the cockpit energizes the centrifuge control 208 a signal is conveyed to the computer 206 which analyzes the message and directs energization of centrifuge drive motor 115. The centrifuge drive shaft 116 and centrifuge drive sprocket 118 keyed thereto are rotated, causing movement of the centrifuge drive chain 120. This in turn causes rotation of the stationary driving drum 121.

The centrifuge arm driving cable 131 being in tight frictional contact with the fixed driving drum 121 as well as the movable driving drum 124, due to pre-tension of the jacking mechanism 126 and driving tension, is given linear translation and pull on one side of either the fixed or movable driving drum depending on the direction of rotation. At the far end of the centrifuge arm 30 and elevator wings 45 and 45a, the centrifuge drive cable 131 is led over sheaves 127, 128 and 129 and 130, into tight frictional engagement with rubber lined guide notch 18 around fixed track 12, exerting tangential pull on the movable elevator trolley wings, thus continuously pulling them and the centrifuge arm 30 around the circular track. The centrifuge drive cable 131 is thus picked up and laid down continuously in the guide notch 18 providing for the centrifuge arm drive. It is always in frictional contact with the guide notch 18 over approximately 90 percent of the track periphery. This long length of tight frictional engagement of the centrifuge drive cable 131 with the fixed track 12, and the multiple turns of the centrifuge drive cable about the stationary and movable driving drums 121 and 124, insures positive, slipless, non-backlash driving for the centrifuge arm 30 and the components carried thereby including the cockpit 105.

Since the centrifuge drive motor 115 is reversible, clock-wise or counterclockwise pivotal movement of the centrifuge arm 30 about the pivot pylon 20 is possible.

Operation of elevator control 209 results in actuation of elevator drive motor 135 as determined by the computer 206. The shaft 136 of the elevator drive motor powers elevator idler shaft 138 via elevator drive sprocket 137 and idler driven shaft 139. The elevator idler shaft drives the elevator line shaft 142 through elevator idler shaft drive sprocket 141, elevator line shaft drive chain 144 and elevator line shaft sprocket 143. The winding drums 145 and 146 keyed to the end of line shaft 142 are thereby rotated. Depending on the direction of rotation of elevator drive motor 135, either the shaft cables 151 and 153 are wound and the lowering cables 155 and 157 unwound from the respective winding drums to raise the elevator, or vice versa to lower the elevator.

Yaw drive motor 165 is actuated by the operation of the yaw control 210 through the computer 206. This results in the rotation of yaw drive chain 168 which is entrained about the yaw frame drive ring 89 and yaw motor drive sprocket 167. The yaw motor tensioning idlers 171 and 172 place a sufficient amount of pressure on the back of the yaw motor drive chain so as to force the teeth 170 thereof into the resilient deformable lining 90 on yaw frame drive ring 89. This drive arrangement is essentially the same as a positive chain and sprocket arrangement; however, it provides the additional advantages of absorbing some of the shock on starting and stopping, and is also silent in operation. The yaw drive motor 165 is reversible to provide movement in either direction about the yaw axis 94. Movement of the cockpit 105 about the yaw axis, as controlled by the yaw drive 164, is generally limited to a plus or minus 180 degrees or a total of 360 degrees.

Pitch control 211 actuates pitch drive motor 180 as determined by computer 206. The pitch motor 180 powers transfer shafts 184 and 184a by chain drives which includes pitch drive sprockets 183, 183a transfer shaft driven sprockets 185 and 185a, and drive chains 182 and 182a which cooperate with the respective sprockets. The drive sprockets 186 and 186a of transfer shaft 184 and 184a drive the pitch segment drive chains 187 and 187a. The ends of these chains are anchored to the pitch drive segments 101 and 102 as previously explained. The tension rollers 189 and 189a remove all slack in chains 187 and 187a. The resilient deformable lining on the pitch drive segments 101 and 102 provide silent, shock reducing, wearproof operation. The pitch drive 179 is similar in this respect to the yaw drive 164. The pitch drive 179 is limited in its movement about the pitch axis to plus or minus 45 degrees or a total of 90 degrees of movement.

Roll control 212, when actuated, provides for the operation of roll drive motor 195. Roll drive sprocket 197 moves roll drive chain 198 which is entrained about the roll drive track 108. As in the yaw drive 164, the tensioners 200 force the teeth on roll drive chain 198 into engagement with the resilient lining of the roll drive track 108 to give a similar drive. The roll drive 194 is capable of 360 degree movement in either direction about the roll axis.

In the above explained operation, each direction of movement of the motion simulator assembly 10 has been explained separately. It should be understood, however, that any combination of the controls 208 through 212 may be actuated simultaneously to give combined movements. For example, if the centrifuge control 208, elevator control 209, and roll control 212 are actuated simultaneously, the centrifuge arm 30 will have circular translation about the pylon 20, the elevator cage 60 will have vertical translation, and the cockpit will move about the roll axis. It should be remembered that the cockpit 105 is carried by the gimbal structure 85 which in turn is carried by the elevator cage 60 attached to the centrifuge arm 30. Thus, all three of these simulated motions are imparted to the cockpit 105.

It can be seen that the above described centrifuge mounted motion simulator has many advantages over prior art arrangements. Initially, the motion simulator is constructed from a minimum number of standardized component parts which are advantageously arranged to provide a maintenance free, economically feasible structure. The manned cockpit is capable of 5 degree freedom of motion including reversible, vertical translation at the far end of the centrifuge arm. By supporting the far end of the centrifuge arm on a ground located track, all of the vertical dead load and inertial forces, as well as most of the horizontal forces are transmitted directly thereto. This facilitates the use of a light, low inertia space frame structure for the centrifuge arm, elevator tower and accompanying elevator wings. Use of this type of structure reduces the power requirements necessary, and provides for its application through light, simple, wire cables or chain belt drives from inertia-wise advantageous locations.

Obviously, many modifications and variations of the present invention are possible in the light of the above teachings. It is, therefore, to be understood that within the scope of the appended claims the invention may be practiced otherwise than as specifically described herein.

What is claimed is:

1. A centrifuge mounted motion simulator comprising; a pylon, a centrifuge arm having a pivotal connection at one end to said pylon and being movable thereabout, ground support means supporting the other end of said centrifuge arm, a cockpit, means connecting said cockpit to said centrifuge arm other end for vertical movement, means to vertically move said cockpit independently of said centrifuge arm's speed of rotation, and drive means for rotating said centrifuge arm and cockpit about said pylon.

2. A centrifuge mounted motion simulator comprising; a pylon, a centrifuge arm having a pivotal connection at one end to said pylon and being movable thereabout, closed track means surrounding said pylon, support means fixed to the other end of said centrifuge arm including wheeled trolley means running on said track, said track having a peripheral guide thereabout, driving drum means carried by said centrifuge arm, an elongated flexible member entrained about said guide and said driving drum means, power means for actuating said driving drum means to cause said flexible member to react with said guide and move said centrifuge arm about said pylon.

3. A centrifuge mounted motion simulator as in claim 2 wherein said driving drum means includes at least a fixed driving drum and a moveable driving drum, and jacking means for separating and maintaining said driving drums separated to tension said elongated flexible member, said driving drums and power means being located within the proximity of said pylon to minimize inertial forces.

4. A centrifuge mounted motion simulator as in claim 3 wherein said driving drums have multiple grooves; said grooves and said guide being lined with resilient material to minimize slippage between said driving drums, guide and said elongated flexible member.

5. A centrifuge mounted motion simulator comprising; a pylon, a centrifuge arm having a pivotal connection at one end to said pylon and being moveable thereabout, ground support means supporting the other end of said centrifuge arm including an elevator tower, elevator cage means vertically movable on said tower, a cockpit carried by said elevator cage means, and drive means for rotating said centrifuge arm about said pylon and for raising and lowering said elevator cage means including said cockpit.

6. A centrifuge mounted motion simulator comprising; a pylon, a centrifuge arm having an inner and outer end the former of which has a pivotal connection with said pylon; closed track means surrounding said pylon, support means fixed to the outer end of said centrifuge arm including an elevator tower having oppositely directed elevator wings with wheeled trolley means running on said track, elevator cage means movable on said elevator tower, a cockpit carried by said elevator cage means, said track means having a cable guide thereabout, driving drum means carried by said centrifuge arm, a centrifuge arm drive cable entrained about said drive cable guide and driving drum means; first drive means for actuating said driving drum means to cause said drive cable to react with said cable guide and rotate said centrifuge arm about said pylon, and second drive means for raising and lowering said elevator cage means and cockpit carried thereby.

7. A centrifuge mounted motion simulator as in claim 6 wherein said second drive means includes winding drum means carried by said centrifuge arm, elevator cable means fixed to said elevator cage means and to said winding drum means, and motor means actuating said winding drum means for raising and lowering said elevator cage means and cockpit.

8. A centrifuge mounted motion simulator as in claim 7 wherein said winding drum means includes a pair of spaced winding drums having adjacent reversely wound spiral grooves.

9. A centrifuge mounted motion simulator as in claim 7 wherein said elevator cage includes takeup eye means and said elevator cable means are fastened to said takeup eye means, and said motor means for actuating said winding drum means and said winding drum means are located in the proximity of said pylon to minimize inertial forces.

10. A centrifuge mounted motion simulator comprising; a pylon, a centrifuge arm having a pivotal connection at one end to said pylon and being movable thereabout, ground support means supporting the other end of said centrifuge arm including an elevator tower, elevator cage means vertically movable on said tower, a cockpit carried by said elevator cage means, gimbal means mounting said cockpit on said elevator cage means for movement about a yaw, pitch and roll axis, and control means and drive means connected with said centrifuge arm and being operable to provide movement of said centrifuge arm, elevator cage means and said cockpit for five degrees of motion simulation.

11. A centrifuge mounted motion simulator comprising; a pylon, a centrifuge arm having a pivotal connection at one end to said pylon and being movable thereabout, ground support means supporting the other end of said centrifuge arm including an elevator tower, elevator cage means vertically movable on said tower; a yaw frame pivotally mounted on said elevator cage means; a cockpit carried by said yaw frame, a yaw drive ring fastened to said yaw frame, yaw motor means carried by said elevator cage means; a yaw drive chain interconnecting said yaw motor means and said yaw drive ring to move said cockpit carried by said yaw frame about a yaw axis, elevator drive means for raising and lowering said elevator cage means; and centrifuge drive means for rotating said centrifuge arm about said pylon.

12. A centrifuge mounted motion simulator as in claim 11 wherein said yaw drive ring is lined with a deformable resilient material, said yaw drive chain having teeth, said teeth forming temporary indentations in said yaw ring lining to provide a silent, positive engagement, nonslip, zero backlash drive.

13. A centrifuge mounted motion simulator comprising: a pylon, a centrifuge arm having a pivotal connection at one end to said pylon and being movable thereabout, ground support means for the other end of said centrifuge arm including an elevator tower, elevator cage means vertically movable on said tower, a yaw frame pivotally mounted on said elevator cage means, means connected with said elevator cage means to move said frame about said yaw axis; a pitch frame pivotally mounted on said yaw frame, a cockpit carried by said pitch frame, pitch drive segments fixed to said pitch frame, pitch motor means carried by said yaw frame, pitch drive chains anchored to said pitch drive segments, said pitch drive chains being driven by said pitch motor means for moving said cockpit carried by said pitch frame about a pitch axis; elevator drive means for raising and lowering said elevator cage means; and centrifuge drive means for rotating said centrifuge arm about said pylon.

14. A centrifuge mounted motion simulator comprising: a pylon, a centrifuge arm having a pivotal connection at one end to said pylon and being movable thereabout, ground support means for the other end of said centrifuge arm including an elevator tower, elevator cage means vertically movable on said tower, a yaw frame pivotally mounted about a yaw axis on said elevator cage means, means connected with said elevator cage means to move said yaw frame about said yaw axis; a pitch frame pivotally mounted about a pitch axis on said yaw frame, a cockpit pivotally mounted on said pitch frame, means connected with said yaw frame to move said pitch frame about said pitch axis, a roll drive ring fixed to said cockpit, roll motor means carried by said pitch frame, a roll drive chain interconnecting said roll motor means and roll drive ring for moving said cockpit about a roll axis, elevator drive means for raising and lowering said elevator cage means; and centrifuge drive means for rotating said centrifuge arm about said pylon.

15. A centrifuge mounted motion simulator as in claim 14 wherein said roll drive ring is lined with a deformable resilient material, said roll drive chain having teeth, said teeth forming temporary indentations in said deformable resilient material to provide a silent, positive engagement, nonslip, zero backlash drive.

16. A centrifuge mounted motion simulator comprising: a pylon, a centrifuge arm having a pivotal connection at one end to said pylon and being movable thereabout; ground support means supporting the other end of said centrifuge arm including an elevator tower, elevator cage means vertically movable on said tower; a yaw frame pivotally mounted on said elevator cage means about a vertical yaw axis, a yaw drive ring fastened to said yaw frame, yaw motor means carried by said elevator cage means driving a yaw drive chain engaging said yaw drive ring to move said yaw frame about the yaw axis, a pitch frame pivotally mounted within said yaw frame about a horizontal pitch axis located transversely with respect to said yaw axis, pitch motor means carried by said yaw frame, pitch drive chains anchored to said pitch drive segments, said pitch drive chains being driven by said pitch motor means for moving said pitch frame about said pitch axis, a cockpit pivotally mounted on said pitch frame about a roll axis located transversely with respect to both said yaw and pitch axes, a roll drive ring fixed to said cockpit, roll motor means carried by said pitch frame, a roll drive chain interconnecting said roll motor means and roll drive ring for moving said cockpit about said roll axis, elevator drive means for raising and lowering said elevator cage means; and centrifuge motor and drive means for rotating said centrifuge arm about said pylon.

17. A centrifuge mounted motion simulator as in claim 16 wherein said yaw drive ring, said pitch drive segments and said roll drive ring are lined with a deformable resilient material; said yaw drive chain, said pitch drive chains and said roll drive chain having teeth forming temporary indentations in said linings to provide a shock reduced, silent, positive engagement, nonslip, zero backlash drive.

18. A centrifuge mounted motion simulator as in claim 17 wherein tensioning means are applied to said yaw drive chain, said pitch drive chains, and said roll drive chain to force said chain teeth into said linings.

19. A centrifuge mounted motion simulator comprising: a pylon, a centrifuge arm having a pivotal connection at one end to said pylon and being movable thereabout; closed track means surrounding said pylon; support means fixed to the other end of said centrifuge arm including wheeled trolley means running on said track, said track having a cable guide thereabout, driving drum means carried by said centrifuge arm, a centrifuge arm drive cable entrained about said cable guide and said driving drum, centrifuge drive means for rotating said driving drum means to cause said drive cable to react with said cable guide and rotate said centrifuge arms; an elevator cage carried by said centrifuge arm, elevator driving means including winding drums carried by said centrifuge arm, elevator drive cables connected to said elevator cage and to said winding drums for raising and lowering said elevator cage; a yaw frame pivotally mounted on said elevator cage about a vertical yaw axis, a yaw drive ring fastened to said yaw frame, yaw motor means carried by said elevator cage, a yaw drive chain interconnecting said yaw drive ring and yaw motor means to move said yaw frame about the yaw axis, a pitch frame including pitch drive segments, said pitch frame being pivotally mounted within said yaw frame about a horizontal pitch axis located transversely with respect to said yaw axis, pitch motor means carried by said yaw frame, pitch drive chains anchored to said pitch drive segments, said pitch drive chains being driven by said pitch motor means for moving said pitch frame about said pitch axis, a cockpit pivotally mounted within said pitch frame about a roll axis located transversely with respect to both said yaw and pitch axis, a roll drive ring fixed to said cockpit, roll motor means carried by said pitch frame, a roll drive chain interconnecting said roll motor means and said roll drive ring for moving said cockpit about said roll axis; and control means operable by an operator in said cockpit to actuate said centrifuge drive means, elevator driving means, and yaw pitch and roll motor means, to provide separate or simultaneous movement of said centrifuge arm, said elevator cage and the cockpit about the yaw, pitch and roll axes.

20. A centrifuge mounted motion simulator as in claim 19 wherein said cable guide and driving drum means are lined with a resilient material, and tensioning means applied to said centrifuge arm cable to provide a tight, nonslip friction drive.

21. A centrifuge mounted motion simulator as in claim 19 wherein said yaw drive ring, said pitch drive segments and said roll drive ring are lined with a resilient deformable material, said yaw drive chain, said pitch drive chains and said roll drive chain having teeth, and means for tensioning said chains whereby said teeth form temporary indentations in said resilient deformable material to provide a silent, positive engagement, nonslip zero backlash drive.

22. A centrifuge mounted motion simulator comprising: a pylon, a centrifuge arm having a pivotal connection at one end to said pylon, first driving means mounted on said arm for moving said arm about said pylon, vertically movable cockpit means carried by the other end of said centrifuge arm, and second driving means mounted on the arm in the proximity of said pylon to minimize inertial forces, and being interconnected with said cockpit and centrifuge arm to provide reversible vertical translation of said cockpit simultaneously with reversible rotation of said centrifuge arm.

References Cited by the Examiner

UNITED STATES PATENTS

| | | | |
|---|---|---|---|
| 595,051 | 12/97 | Elieson | 74—229 |
| 996,653 | 7/11 | Brown | 73—1 |
| 1,342,871 | 6/20 | Ruggles | 35—12 |
| 1,393,456 | 10/21 | Ruggles | 35—12 |
| 1,590,990 | 6/26 | Fuller | 104—235 |
| 1,791,655 | 2/31 | Bisch | 35—12 |
| 2,357,481 | 9/44 | Mallon | 35—12 |
| 2,528,516 | 11/50 | Hermann | 35—12 X |
| 2,814,944 | 12/57 | Brown | 73—1 |
| 2,954,702 | 10/60 | Petersen | 74—230.7 |
| 2,987,932 | 6/61 | Szonn | 74—229 |
| 2,988,925 | 6/61 | Sauer | 74—229 |

FOREIGN PATENTS 11,438   5/07   Great Britain.

EUGENE R. CAPOZIO, *Primary Examiner.*

LEO SMILOW, JEROME SCHNALL, *Examiners.*